United States Patent [19]

Zieg et al.

[11] 3,837,358

[45] Sept. 24, 1974

[54] BACKFLOW PREVENTER VALVE ASSEMBLY

[75] Inventors: Clifford V. Zieg; William Yelich, both of Costa Mesa, Calif.

[73] Assignee: Cla-Val Co., Costa Mesa, Calif.

[22] Filed: Dec. 6, 1971

[21] Appl. No.: 205,022

[52] U.S. Cl. ............................. 137/614.2, 137/613
[51] Int. Cl. ............................................. E03b 7/07
[58] Field of Search ........ 137/102, 107, 614.2, 613, 137/505; 251/61, 61.1, 61.2, 61.5

[56] References Cited
UNITED STATES PATENTS

| | | | |
|---|---|---|---|
| 2,693,932 | 11/1954 | Richards | 251/61.5 |
| 2,946,341 | 7/1960 | Sullivan | 137/613 X |
| 3,276,465 | 10/1966 | Wyckoff | 137/107 |
| 3,283,772 | 11/1966 | Ensign | 137/107 |
| 3,321,173 | 5/1967 | Seger | 251/61.5 X |
| 3,461,913 | 8/1969 | Scott | 251/61.5 X |

Primary Examiner—William R. Cline
Assistant Examiner—Ira S. Lazarus
Attorney, Agent, or Firm—Richard L. Gausewitz

[57] ABSTRACT

Two series-related check valves are separated by a chamber (the "zone") adapted to be drained by a relief valve in order to insure against backflow of water through the check valve which is nearest the water main. The relief valve incorporates a poppet which is operated by the combined actions of a single diaphragm assembly and a single bellofram assembly, together with a spring which biases the poppet toward open position. The valve seat for the poppet has an effective diameter slightly greater than that of the bellofram assembly, whereby to create a seating pressure which maintains the poppet fully closed at all times except when there is an actual or incipient backflow condition. The poppet seat is beveled in a manner which creates valve-opening forces in response to initial cracking of the poppet off its seat. Furthermore, the clamping disc for the poppet is shaped to cause additional valve-opening forces to be present upon such cracking of the poppet.

23 Claims, 6 Drawing Figures

PATENTED SEP 24 1974 3,837,358

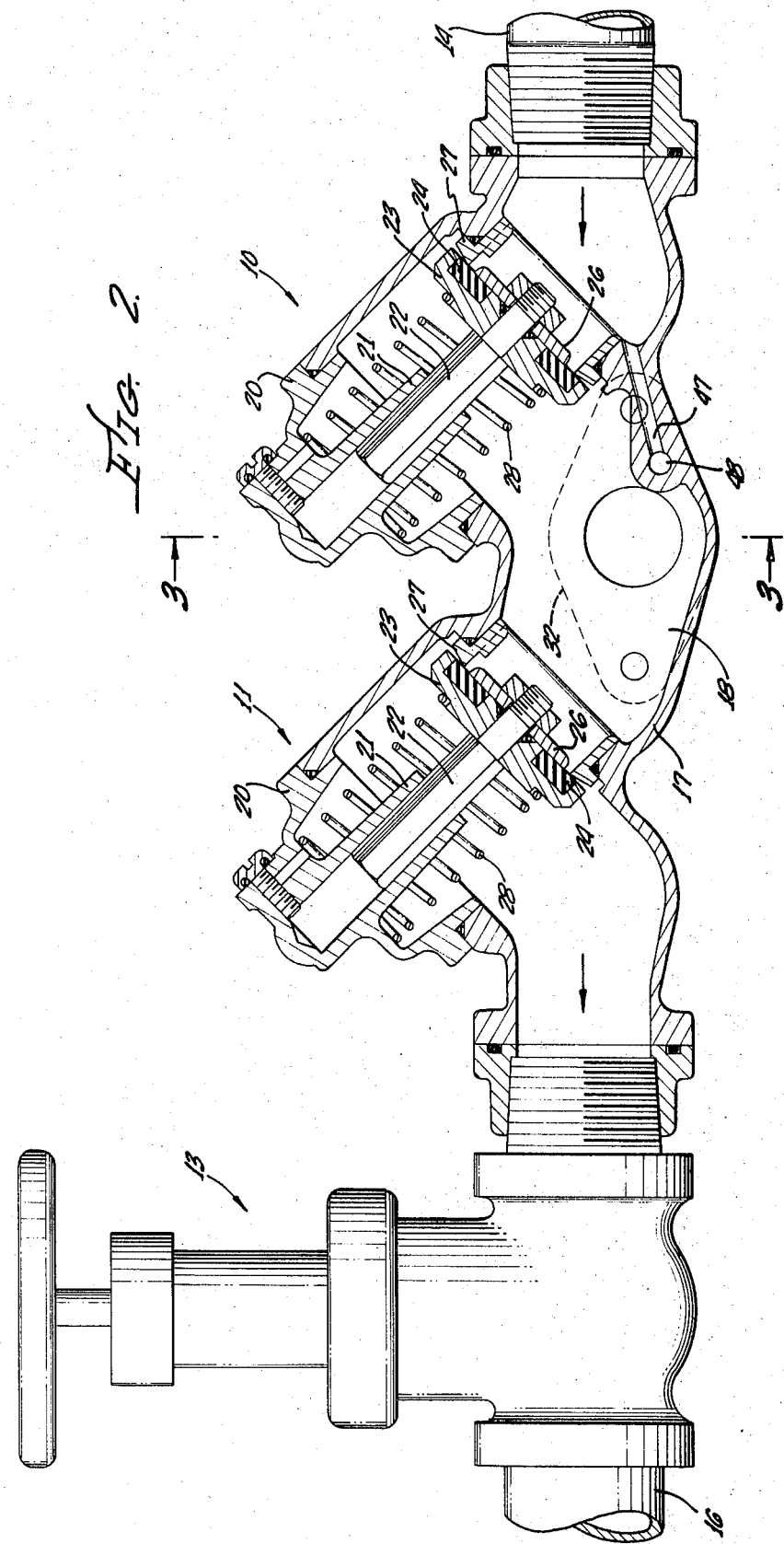

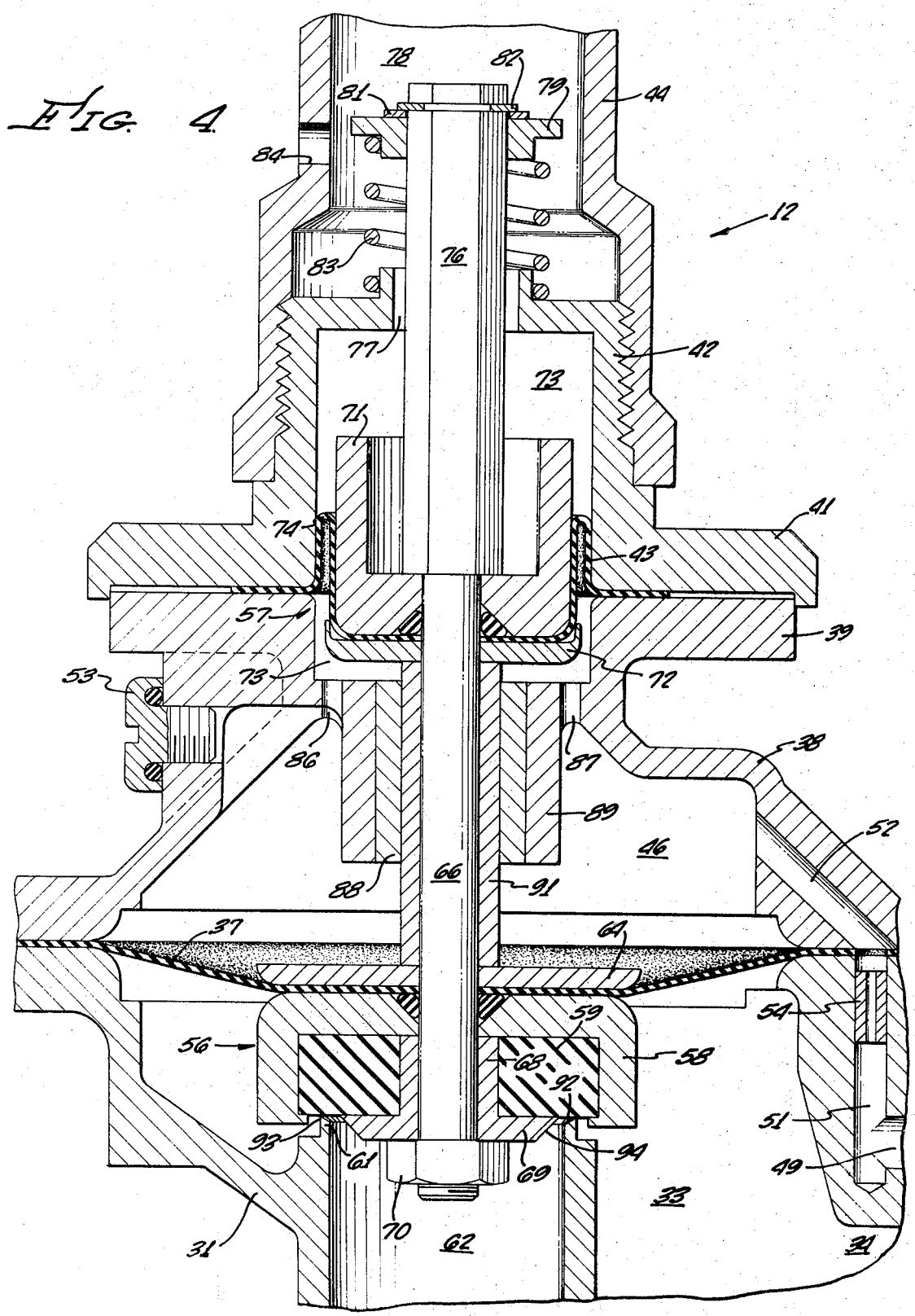

BACKFLOW PREVENTER VALVE ASSEMBLY

BACKGROUND OF THE INVENTION

1. Field of the Invention

This invention relates to the field of backflow preventers, particularly those employed in water lines between the main and the service pipe, and wherein it is critically important that no water flow back into the main where it could have a contaminating effect.

2. Description of Prior Art

Backflow preventer valve assemblies now being manufactured by the assignee of the present invention incorporate three bellofram assemblies, three external pipes (in addition to the line), and sophisticated check valves. Such backflow preventer assemblies are highly satisfactory for the larger sizes of pipe, for example having diameters of 2 inches or more. However, the size and complexity of such existing assemblies make them impractical for use with the smaller pipe sizes, namely those having diameters of 1 inch or less. For such small pipe sizes it is essential that the backflow preventer assemblies be relatively small in size and have relatively few parts, all without sacrificing reliability and sensitivity of operation even at low pressure differentials. It is also highly desirable that there be no external hoses or conduits, all connections being instead made by internal porting.

Other backflow preventer valve assemblies are characterized by certain major problems. For example, one backflow preventer assembly incorporates a relief valve having two seats. With such an arrangement it is theoretically impossible to achieve the correct seating pressure on both seats simultaneously, so that leakage problems tend to be present. To state a second example, another backflow preventer assembly incorporates a piston in its relief valve, with the result that an excessive amount of friction is created.

SUMMARY OF THE INVENTION

The present backflow preventer requires only a single diaphragm assembly and a single bellofram assembly, and requires only two internal conduits (as distinguished from external pipes) from the poppet-type check valves to the relief valve. Despite the use of few parts, there is effective prevention of backflow and, furthermore, there is highly effective closing of the relief valve at all times during continuance of normal (no backflow) conditions in the system. Very importantly, the use of the single diaphragm and single bellofram results in low-friction operation, so that low pressure differentials will operate the relief valve in a reliable and effective manner.

The poppet seat has an effective diameter which is larger, but only slightly larger, than that of the bellofram assembly. The seat is beveled in such a manner that the flow present upon cracking of the poppet off the seat will not create suction conditions but instead pressure conditions tending to further open the valve. Such further valve opening is also caused by impingement of the water against the inclined edge of a clamping disc.

BRIEF DESCRIPTION OF THE DRAWINGS

FIG. 1 is an isometric view showing the backflow preventer assembly of the present invention, together with an associated gate valve;

FIG. 2 is a longitudinal vertical central sectional view of the backflow preventer;

FIG. 3 is a transverse sectional view taken on line 3—3 of FIG. 2;

FIG. 4 is a greatly enlarged sectional view showing the relief valve of FIG. 3, in closed condition;

DETAILED DESCRIPTION OF A PREFERRED EMBODIMENT

Figure 5:
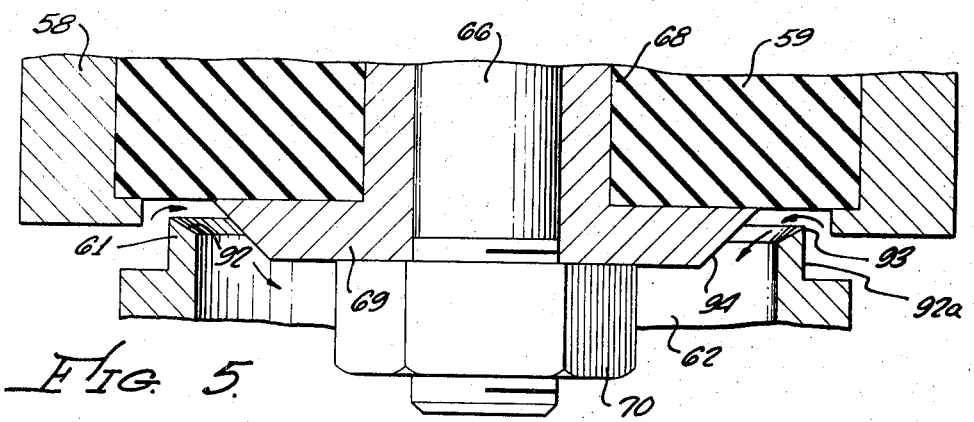
FIG. 5 is a further enlarged fragmentary sectional view showing only the seat portion of the relief valve, and in the condition which occurs immediately after opening or "cracking" of the valve.

Throughout this specification and claims, the term "upstream" is employed to denote the normal flow direction (no backflow), namely from the water main to the service pipe. Correspondingly, the term "downstream" also relates to such normal flow direction from the main to the service pipe. Thus, during backflow conditions the actual flow direction is from the downstream side of a check valve (namely, the check valve nearest the service pipe) to the upstream side thereof.

Figures 1, 3:
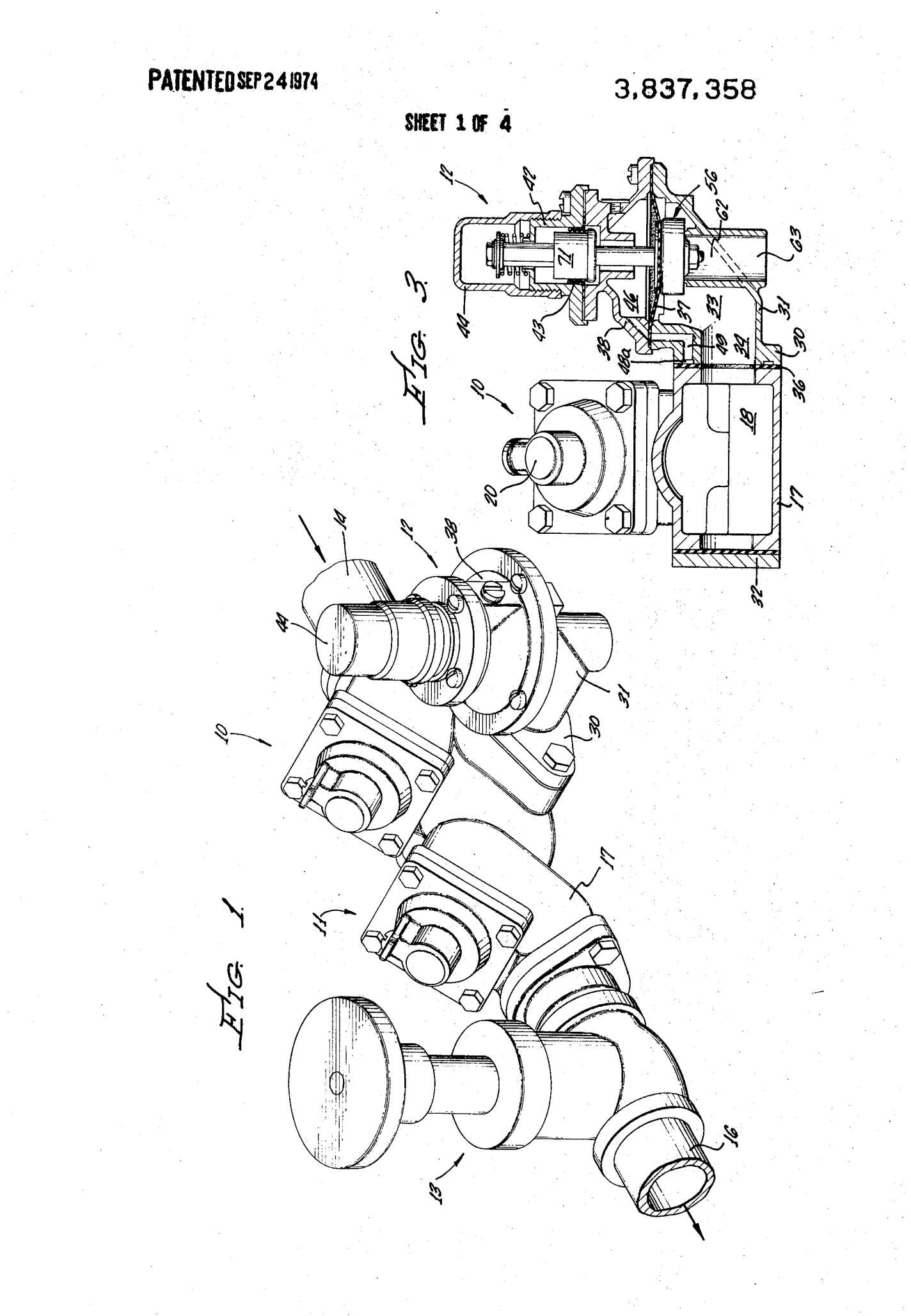

Referring first to FIG. 1, there is shown a backflow preventer valve assembly incorporating an upstream check valve 10, a downstream check valve 11, and a relief valve 12 adapted to drain the zone between the two check valves 10 and 11 in response to certain pressure conditions.

In a normal installation, the backflow preventer valve assembly is associated with upstream and downstream gate valves, only the latter one of which is indicated at 13. The upstream gate valve, not shown, is incorporated in the water main 14, whereas the downstream gate valve is incorporated in the service pipe 16 which leads to various water-using fixtures, etc.

Both of the check valves 10 and 11 are incorporated in a common body 17 as shown in FIGS. 1 and 2, such body also defining the "zone" or intermediate chamber 18. The check valves are identical to each other; therefore, only one will be described.

Each check valve 10 and 11 comprises (FIG. 2) a cover 20 which is sealingly bolted to the common body 17 over a valve opening therein. Integrally formed on the cover 20 is a stem guide 21 which slidably receives the stem 22 of a poppet valve. Stated more definitely, the stem extends through a disc retainer 23 in which is mounted a valve disc 24 formed of elastomeric material, the disc being maintained in position by a clamping element 26 and an associated nut.

The valve disc 24 rests on a seat 27 which is sealingly mounted in an internal port in common body 17. A helical compression spring 28, which is mounted between disc retainer 23 and cover 20, serves to press the poppet assembly against seat 27. Spring 28 is sufficiently weak that it will not prevent opening of the poppet valve, with consequent downstream flow through the valve assembly, when the pressure in water main 14 is a predetermined amount above that in zone 18, or when the pressure in the zone is a predetermined amount above that in the service pipe 16 (depending upon which of the two valves 10, 11 is being referred to).

It is emphasized that means (namely relief valve 12) must be provided to effectively drain the zone 18, when backflow conditions are present, in order to insure against contamination of the water in main 14. Let it be assumed, for purposes of illustration, that the pressure in service pipe 16 is above that in zone 18, which condition can occur when there is excessive demand on the main 14 by users upstream from the present assembly. The check valve 11 nearest service pipe 16 will then attempt to close. It is, however, possible that such check valve 11 will leak and permit backflow of water from the service pipe 16 into zone 18. If there were then no provision for effectively draining the zone 18, the described leakage could pass through the check valve 10 (due to malfunction thereof) and contaminate water main 14. With provision for effectively and rapidly draining the zone 18, the above type of malfunction, and other types of malfunction, cannot occur and it is assured that contamination will never reach the main 14.

It is pointed out that the zone 18 should not be completely drained of water at any time, except when the pressure in main 14 becomes very low (such as 2½ psi to 3½ psi). Unless the main pressure is thus very low, it is desired that (during continuance of backflow conditions) the relief valve open just far enough to permit the zone pressure to lower to a certain value (such as 2½ psi to 3½ psi below the main pressure). It is also pointed out that sticking of the downstream check valve 11 in a relatively wide-open position requires that the relief valve 12 open relatively wide in order to maintain the zone pressure at the desired value.

DESCRIPTION OF RELIEF VALVE 12

Both sides of the common body 17, adjacent zone 18, are shaped to seat a companion flange 30 which is formed integrally on the lower body 31 of relief valve 12. Thus, a relief valve 12 may be mounted on either side of body 17. Since a relief valve is only mounted on one side of any one body 17, the opening on the other side thereof is covered sealingly by a companion cover 32 (FIG. 3). It is to be understood that suitable bolts or screws are provided as necessary to secure the various parts together, being indicated in FIG. 1. Each valve 10–12 may be disassembled, inspected, and/or repaired without being removed from the line, after closing the associated gate valves.

The chamber 33 within lower body 31 of relief valve 12 communicates through an opening 34 with the zone 18, there being a gasket 36 provided around the opening to prevent leakage from the valve. Water from zone 18 may pass through opening 34 into chamber 33 and fill the space below a diaphragm 37 which is sealingly mounted between the upper rim of lower body 31 and the lower portion of an intermediate body 38, as shown in enlarged form in FIG. 4. Correspondingly, the upper portion of intermediate body 38 is provided with a flange 39 over which is seated a flange 41 on a cover member 42, there being disposed between the flange 39 and flange 41 the peripheral portion of a bellofram (rolling diaphragm) 43. Over the cover member 42 is mounted, by means of a threaded connection, a cap 44.

As above indicated, water at zone pressure is introduced into the chamber 33 beneath diaphragm 37. There will next be described the internal porting (passageways) by which water at upstream pressure is introduced into the chamber 46 which is defined in intermediate body 38 above diaphragm 37. It is a feature of the present valve assembly that it is particularly adapted for such internal porting, as distinguished from external pipes and conduits.

Referring to FIG. 2, water from the water main may pass through the upstream end of common body 17 into a passage 47 through such body (the upstream end of passage 47 being upstream of the first check valve 10). Passage 47 communicates with a second passage 48 (FIG. 2) which, in turn, communicates with an opening (not shown) in the gasket 36. Water from the passage 48 passes through the opening in gasket 36 into an annular groove 48a (FIG. 3) in the companion flange 30. The water then passes through the annular groove into a horizontal passage 49 (FIG. 3) in lower body 31. The horizontal passage 49 communicates with a vertical passage 51 (FIGS. 4 and 6) which, in turn, communicates through an opening in diaphragm 37 with a passage 52 in intermediate body 38 and which leads to chamber 46. Thus, water flows into the chamber 46 to fill the same (all air being initially expelled from such chamber 46 through a removable plug screw 53). An orifice plug 54 is mounted in passage 51 to restrict the rate of flow of water into the chamber 46 and thereby prevent undesired surging and hunting conditions.

The forces present on opposite sides of diaphragm 37 cooperate with other forces, described below, to effect shifting of a poppet assembly 56 and a connected balancing and biasing assembly 57, the latter assembly including the bellofram 43.

Poppet assembly 56 comprises an inverted, cup-shaped disc retainer 58 in which is mounted a disc 59 (having a central aperture) of elastomeric material. Disc 59 seats, when the valve is in the closed condition of FIGS. 3 and 4, on a circular valve seat 61 the shape and operation of which are described in detail below. Such seat 61 is at the upper end of an internal conduit 62 which is formed integrally with lower body 31 and which vents or drains at 63 to the ambient region (FIG. 3).

The upper surface of disc retainer 58 is in flatwise engagement with the central region of the underside of diaphragm 37. A diaphragm washer 64 is mounted in chamber 46 and in flatwise engagement with the upper surface of the central region of the diaphragm. Both the disc retainer 58 and the diaphragm washer 64 are mounted around the cylindrical lower section 66 of a valve stem, and leakage through the diaphragm 37 around the valve stem is prevented by an O-ring which is disposed in a beveled annular region in the disc retainer.

Lower section 66 of the valve stem also extends through the tubular stem 68 for a clamping disc 69, such stem seating closely within the aperture in disc 59. Clamping disc 69 extends radially to retain the disc 59 in position and also to perform other functions described below. The lower end of valve stem section 66 is threaded for reception of a nut 70.

Balancing and biasing assembly 57 comprises (in addition to bellofram 43) a cup-shaped cylindrical piston 71 which seats snugly within the bellofram 43 and is mounted around section 66 of the valve stem. The lower end of piston 71 therefore seats against the upper surface of the central region of bellofram 43, and a retainer plate 72 seats against the lower surface of the central region of such bellofram. An O-ring is mounted around stem section 66, with a beveled portion of the piston, in order to prevent leakage around the stem.

The piston 71 and bellofram 43 are mounted in a cylindrical chamber 73 which is divided into upper and lower subchambers by the bellofram. Such chamber 73 is defined by cover member 42 and also by a portion of intermediate body 38 radially inwardly of flange 39. The diameter of chamber 73 is sufficiently greater than that of the external cylindrical surface of piston 71 that return-bent or reverse-bent portions of bellofram 43 may fit therebetween and permit a gap to occur between such return-bent portions. Thus, upon upward and downward movements of piston 71 the bent upper edge 74 of the bellofram moves upwardly and downwardly in the annulus (or gap) defined between the piston and the wall of the chamber.

In addition to its cylindrical lower portion 66, the valve stem has a hexagonal upper portion 76 which extends upwardly from the upper surface of the radial wall of piston 71. The portion 76 passes through an oversized axial opening 77 (FIG. 4) in cover 42, and into the chamber 78 defined by cap 44.

A spring retainer 79 is mounted at the upper end of the hexagonal portion of the valve stem and is secured in position by a washer 81 and a snap ring 82. Seated between the spring retainer 79 and the upper surface of cover 42 (and around a neck portion of the cover) is a helical compression spring 83 adapted to exert a desired opening force on poppet assembly 56.

A vent opening 84 is provided in cap 44 so that the cap chamber 78 contains air at atmospheric pressure. Similarly, the upper subchamber (above bellofram 43) of chamber 73 contains air at atmospheric pressure, since such upper subchamber communicates with cap chamber 78 through the oversized opening 77. The lower subchamber (beneath the bellofram) is filled with water at a pressure corresponding to that in the chamber 46 above diaphragm 37, this being because of communication effected through four relatively small-diameter ports (spaced 90° apart), two of which are shown at 86 and 87. Such ports are drilled through an interior wall portion of the intermediate body 38, in outwardly-spaced relationship from a bushing 88 which is press-fit into a stem guide 89. Such stem guide projects downwardly, and is formed integrally with the intermediate body.

The bushing 88 slidably receives a tubular spacer 91 which is seated between the lower surface of retainer plate 72 and the upper surface of diaphragm washer 64. Thus, the various elements are maintained in assembled relationship by merely tightening the nut 70 at the lower end of the valve stem.

All of the movable parts of relief valve 12 are coaxial with each other, and the diaphragm and bellofram are perpendicular to the common axis of such coaxial parts. The various parts of the casing or housing of the relief valve are also coaxial with each other and with the movable parts.

Just as the bellofram divides chamber 73 into two subchambers, diaphragm 37 may be regarded as dividing the diaphragm chamber into two subchambers 33 and 46.

DESCRIPTION OF THE BALANCING, AND OF THE POPPET-SEATING BIAS

The characteristics of check valves 10 and 11 are such that, during all periods when the water system is operating normally (no incipient or actual backflow condition) the pressure in zone 18 will be at least 5 psi less than the pressure on the upstream side of check valve 10. As previously described, the pressure in zone 18 is also present in chamber 33 on the underside of diaphragm 37, whereas the pressure on the upstream side of valve 10 is also present in chamber 46 on the upper side of the diaphragm.

Because it is known there is at least a 5 psi pressure differential when the water system is operating as desired, opening of poppet valve assembly 56 (shifting thereof off seat 61) when the pressure differential (between zone 18 and the upstream side of check valve 10) is in the range of about 2 ½ psi to about 3 ½ psi will insure against any adverse effects resulting from an actual or incipient backflow condition. Thus, the relief valve 12 is balanced out in such manner that poppet assembly 56 will lift off seat 61 when the differential is in the range of about 2 ½ to about 3 ½ psi. The pressures tending to cause upward movement of poppet assembly 56 are the pressure in the portion of chamber 73 below bellofram 43, the pressure created by compression spring 83, and the pressure created by the water in chamber 33. The pressure tending to maintain the poppet assembly 56 seated on seat 61 is that present in chamber 46 above the diaphragm 37.

It is highly important that the poppet assembly 56 be maintained firmly seated during normal operation of the water system (no backflow conditions), in order that there will be no dripping or dribbling of water through the junction between seat 61 and disc 59. Because conduit 62 opens to the atmosphere, as does the portion of chamber 73 above bellofram 43, this downward seating pressure is created by causing the effective diameter of seat 61 to be greater, but only slightly greater, than the effective diameter of bellofram 43. The effective diameter of the bellofram is the intermediate diameter thereof, that is to say the difference between the external diameter of piston 71 and the internal diameter of cover 42. As an example, the effective diameter of the bellofram 43 may be approximately 0.8125 inch, whereas the effective diameter of seat 61 may be approximately 0.8170 inch. It is thus assured that there will be no leakage through the relief valve during normal operation of the water system, but only when the relief valve opens in response to an actual or incipient backflow condition.

The effective diameter of seat 61 is, in the illustrated embodiment, the outer diameter thereof (at apex 93 described below).

The spring 83 is necessarily light, since there is only a relatively small resultant fluid-pressure force tending to effect closing of poppet assembly 56 onto seat 61. For example, when the effective bellofram diameter and the effective seat diameter are as specified in the above example, the spring 83 may be one which exerts a valve-opening pressure of 1.9 pounds (when the poppet is seated).

FURTHER DESCRIPTION OF VALVE SEAT 61 AND OF CLAMPING DISC 69

Referring to FIG. 5, there is shown the condition which occurs immediately after cracking of the valve, namely upon initial opening thereof when the pressure differential (between the two chambers 33 and 46) is in the above-indicated range of about 2 ½ to about 3

½ psi. It is emphasized that (as stated above) the system is delicately balanced, and that the compression spring 83 is light. When the pressure in chamber 33 (also in zone 18) is high, for example on the order of about 150 psi, the cracked condition shown in FIG. 5 causes extremely rapid outflow of water between the seat 61 and the valve disc 59. Such rapid outflow of water can, unless the valve seat is properly constructed, create a low pressure condition adjacent the seat and which was sufficiently great to counter-balance the very small net force tending to lift the poppet assembly, so that the valve never opens wide but instead only cracks.

The present seat 61 has a frustoconical upper surface 92 which diverges upwardly to an apex edge 93. Such apex edge is formed where frustoconical surface 92 meets a cylindrical outer wall 92a of seat 61. Very importantly, the angle of divergence of surface 92 is not sufficiently steep that the apex edge 93 will cut the rubber in disc 59. For example, the angle of the frustoconical surface should be about 35 degrees relative to the horizontal.

The water in flowing inwardly (FIG. 5) over apex edge 93 tends to expand in the space between surface 92 and the lower surface of disc 59. Such expansion (or fanning out) of the water does not create any low-pressure conditions due to the Bernoulli effect, or any other effect, but instead (due to the Bernoulli effect) may create a higher pressure condition tending to act upwardly on the disc 59 to aid in lifting the poppet assembly 56 away from the seat 61.

The present invention provides an additional effect causing lifting of the poppet assembly 56 away from the seat. This additional effect is created by forming a frustoconical surface 94 on the peripheral edge of clamping disc 69, such frustoconical surface extending clear to the valve disc 59. The frustoconical surface 94 diverges upwardly. Therefore, as shown by the arrows in FIG. 5, the water flowing rapidly through the gap between apex 93 and the lower surface of disc 59 strikes the surface 94 and then deflects downwardly into the conduit 62. This creates an upward reaction against surface 94 and is an additional force lifting the poppet assembly 56 off of the seat 61.

SUMMARY OF OPERATION

During normal operation of the water system, water flows from the main 14 through both of the check valves 10 and 11 to the service pipe 16, and the pressure drop across the check valve 10 is such that the pressure in zone 18 is at least 5 psi lower than the pressure in the water main 14. The pressure in the zone 18 is transmitted through opening 34 (FIG. 3) to the chamber 33 below diaphragm 37. The pressure in the water main is transmitted through passages 47 and 48 (FIG. 2), annular groove 48a, and passages 49, 51, constrictor 54, and passage 52 to chamber 46 above the diaphragm. The pressure in chamber 46 is transmitted through ports or passages 86 and 87 (and two others, not shown) to the portion of chamber 73 below bellofram 43.

The described balancing of the relief valve operates, when there is at least such 5 psi pressure differential, to maintain poppet assembly 56 seated on seat 61 and prevent drainage of water from the zone 18 through conduit 62. Furthermore, because of the described difference between the effective diameter of bellofram 43 and the diameter of the apex edge 93 of seat 61, there is always sufficient seating pressure to prevent leakage of water between the poppet 56 and its seat.

When the pressure differential reduces to the range of about 2 ½ psi to about 3 ½ psi, it is known that there is an actual or incipient backflow condition. At such time, the upward force created by spring 83 (and the other upward forces) is sufficient to crack the valve to the FIG. 5 position. The upwardly-directed forces are then augmented by the two upward forces described above, namely the force resulting from the Bernoulli effect due to outflow of water between seat 61 and disc 59, and the force created by the impingement of the water against frustoconical surface 94. The relief valve therefore opens sufficiently wide, for example to the open position of FIG. 6, to permit rapid draining of water from zone 18 through opening 34 to chamber 33 and thence through the poppet valve conduit 62 leading to the ambient region. However, as above stated, the relief valve does not open sufficiently wide to permit the pressure in zone 18 to drop below 2 ½ psi to 3 ½ psi unless the pressure in the water main is 2 ½ psi to 3 ½ psi or lower.

Figure 6:
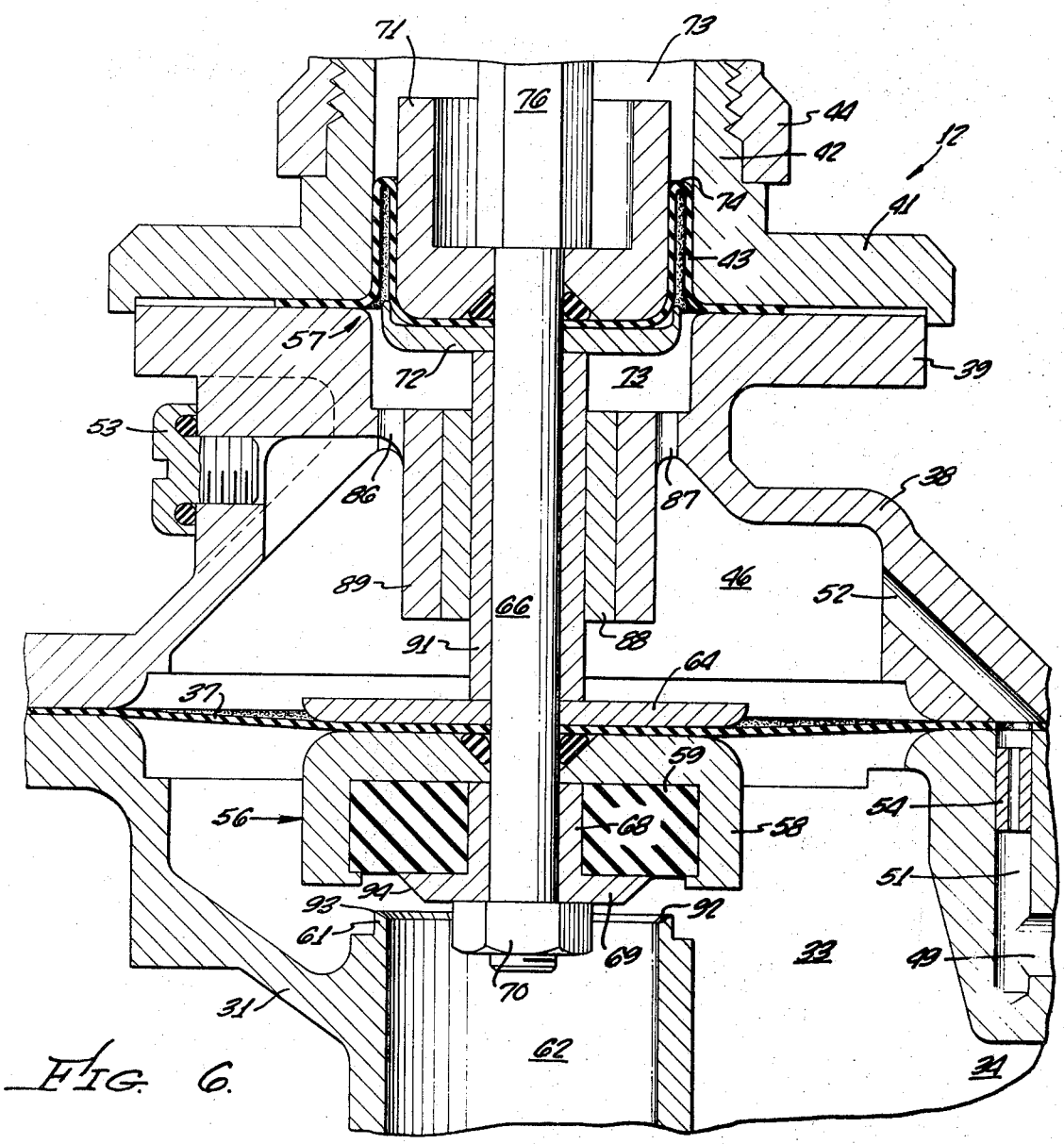
FIG. 6 is a view corresponding to all but the upper portion of FIG. 4, and showing the relief valve in a position permitting rapid flow of water from the zone through the discharge outlet.

When the zone 18 is thus drained, it is assured that the check valve 11 nearest the service pipe 16 will attempt to close. Nevertheless, such closure might be prevented due to malfunction (for example, due to the presence of a pebble in the space between elastomeric element 24 and seat 27, FIG. 2), so that there is backflow of water from the service pipe 16 into the zone. Since the relief valve 11 is open at this time, as described and as shown in FIG. 6, such backflow of water into the zone 18 does not create flow through check valve 10 to water main 14, but instead only results in flow through the now-open poppet valve to conduit 62.

When the pressure in the water main 14 again reaches the normal level, such pressure is communicated through the indicated passages to chamber 46 and is sufficiently great to force the poppet assembly 56 downwardly onto the seat 61, thereby closing the poppet valve. The system then again assumes normal operation, with water from the water main 14 flowing through both of the check valves 10 and 11 to the service pipe 16.

The foregoing detailed description is to be clearly understood as given by way of illustration and example only, the spirit and scope of this invention being limited solely by the appended claims.

We claim:

1. A backflow preventer valve assembly adapted to be mounted in a water line between the water main and a service pipe, which comprises:
    first and second check valves mounted in series relationship relative to each other and defining a zone therebetween,
    both of said check valves being oriented to permit flow of water from said main to said service pipe and to prevent flow of water from said service pipe to said main,
    wall means to define a diaphragm chamber,
    a diaphragm mounted sealingly across said diaphragm chamber and dividing the same into a first subchamber and a second subchamber,
    a bellofram, means to mount said bellofram and to cause one side thereof to be exposed to water pressure present in one of said subchambers, a valve seat through which water may drain from said zone at all times except when said seat is covered by a poppet, a poppet associated with said valve seat and movable between a closed position seated on said seat to block drainage of water therethrough, and an open position spaced from said seat and permitting drainage of water therethrough from said zone, means to connect said poppet to both said diaphragm and said bellofram whereby said poppet is actuated in response to pressures exerted on said diaphragm by water pressure present in said first and second subchambers, and in response to pressure exerted on said bellofram due to water pressure present in said one subchamber, resilient means to bias said poppet toward open position, means to transmit to said second subchamber the water pressure present in said zone, and means to transmit to said first subchamber the water pressure present on the upstream side of said first check valve.

2. The invention as claimed in claim 1, in which a piston is mounted in said bellofram, and in which said bellofram has an effective diameter substantially larger than the outer diameter of said piston.

3. The invention as claimed in claim 2, in which the effective diameter of said bellofram is different from that of said valve seat.

4. The invention as claimed in claim 3, in which the effective diameter of said bellofram is smaller than that of said valve seat, whereby to create a force tending to maintain said poppet seated firmly on said seat at all times except when there is an actual or incipient backflow condition.

5. The invention as claimed in claim 1, in which said valve seat has an apex edge at the outer portion thereof and adapted to sealingly engage said poppet, and in which said valve seat has a beveled surface extending inwardly from said apex edge and inclined away from said poppet.

6. The invention as claimed in claim 1, in which said poppet has an inclined surface provided thereon and which is located radially-inwardly from said seat when said poppet is seated thereon, the angle of incline of said surface being such that water passing between said seat and said poppet upon cracking of said poppet off said seat will strike said inclined surface and create a resultant force tending to move said poppet further away from said seat.

7. The invention as claimed in claim 1, in which said seat has a surface located adjacent said poppet and which is so shaped that flow of water between said surface and said poppet upon cracking of said poppet off said seat will not create any suction forces tending to draw said poppet back into engagement with said seat, and in which said poppet has an inclined surface provided thereon and which is located radially-inwardly from said seat when said poppet is seated thereon, the angle of incline of said surface being such that water passing between said seat and said poppet upon cracking of said poppet off said seat will strike inclined surface and create a resultant force tending to move said poppet further away from said seat.

8. The invention as claimed in claim 1, in which means are provided to vent to the ambient atmosphere the space on the other side of said bellofram.

9. A backflow preventer valve assembly adapted to be connected between a water main and a service pipe, which comprises:

first and second check valves connected in series relationship relative to each other between said water main and said service pipe, both of said check valves being directed to permit flow of water from said main to said service pipe, and to prevent flow of water from said service pipe to said main, wall means to define a diaphragm chamber and a bellofram chamber, a diaphragm mounted sealingly across said diaphragm chamber, said diaphragm dividing said diaphragm chamber into a first subchamber which is relatively adjacent said bellofram chamber and a second subchamber which is relatively remote from said bellofram chamber, a bellofram mounted sealingly across said bellofram chamber, said bellofram dividing said bellofram chamber into a third subchamber which is relatively adjacent said diaphragm chamber and a fourth subchamber which is relatively remote from said diaphragm chamber, a piston mounted axially in said fourth subchamber and having a diameter substantially smaller than that of said bellofram chamber whereby a gap is defined around said piston between said piston and the wall of said bellofram chamber, said bellofram having a portion which extends into said gap in a direction away from said diaphragm chamber, and then reverse-bends back toward said diaphragm chamber, so that a reverse-bent portion is present in said gap, a valve seat provided in said second subchamber and communicating with a discharge opening to the ambient space, a poppet disposed in said second subchamber and seated on the side of said seat which is adjacent said bellofram chamber, resilient means to bias said poppet toward an open position spaced from said seat, means to connect said poppet to said diaphragm and to said bellofram and piston whereby said poppet is actuated in response to the forces acting on said diaphragm and said bellofram and also in response to the force exerted by said resilient means, means to cause the pressure present in said first subchamber to be present in said third subchamber, means to transmit to said first subchamber the water pressure present in said water main, and means to conduct water from said zone to said second subchamber whereby said water discharges through said seat to the ambient space when said poppet is spaced from said seat.

10. The invention as claimed in claim 9, in which means are provided to vent said fourth subchamber to the ambient atmosphere.

11. The invention as claimed in claim 9, in which said resilient means is a spring which is mounted on the side of said bellofram chamber remote from said diaphragm chamber, said spring being associated with said means to connect said poppet to said diaphragm and to said bellofram and piston.

12. The invention as claimed in claim 9, in which said means to connect said poppet to said diaphragm and to said bellofram and piston is an elongated stem, and in which said resilient means is a helical compression spring mounted around said stem on the side of said bellofram chamber which is remote from said diaphragm chamber, said spring having its end adjacent said bellofram chamber seated on a fixed support, and its end remote from said bellofram chamber seated on a spring seat on said stem.

13. The invention as claimed in claim 9, in which said diaphragm chamber, said bellofram chamber and said valve seat are coaxial to each other, in which each of said diaphragm and said bellofram is disposed perpendicularly to and coaxial to the common axis of said chambers and valve seat, and in which said means to connect said poppet to said diaphragm and to said bellofram and piston is an elongated stem coaxial to said chambers and coaxial to said diaphragm and said bellofram.

14. The invention as claimed in claim 13, in which said wall means has the interior wall portion between said diaphragm chamber and said bellofram chamber, in which said stem is slidably mounted through an opening in said interior wall portion, and in which said means which causes the pressure in said first subchamber to be present in said third subchamber comprises port means extending through said interior wall portion between said first and third subchambers.

15. The invention as claimed in claim 9, in which means are provided to vent said fourth subchamber to the ambient atmosphere, and in which the effective diameter of said valve seat is slightly larger than the diameter of said reverse-bent portion of said bellofram at a location midway between the outer wall of said piston and the wall of said bellofram chamber, whereby to maintain seating pressure of said poppet on said seat except during actual or incipient backflow conditions.

16. The invention as claimed in claim 15, in which the force exerted by said resilient means is only a few pounds.

17. The invention as claimed in claim 9, in which said seat has a substantially frustoconical upper surface which diverges upwardly and terminates in an apex edge having a diameter large in comparison to that of the remainder of the portion of said seat nearest said poppet, and in which said poppet has an elastomeric portion adapted to seat sealingly on said apex edge.

18. The invention as claimed in claim 17, in which said apex edge is defined by said frustoconical surface and also by a cylindrical surface, said cylindrical surface being coaxial with said seat.

19. The invention as claimed in claim 9, in which said poppet incorporates an elastomeric disc adapted to seat sealingly on said valve seat, in which a clamping ring is mounted coaxially against said disc on the side thereof remote from said diaphragm, said clamping ring having an upwardly divergent peripheral edge against which water impinges upon cracking of said poppet off said seat, said impingement of said water creating a reaction force tending to shift said poppet away from said seat.

20. The invention as claimed in claim 9, in which each of said check valves is a poppet valve which is spring biased toward closed position and is adapted to open in response to the presence of sufficient water pressure on the upstream side thereof.

21. The invention as claimed in claim 20, in which said poppet valves are mounted in a common housing, and in which each of said poppet valves includes a poppet which is movably mounted for movement in a direction oblique to the axis of said common housing.

22. The invention as claimed in claim 21, in which said wall means to define said diaphragm and bellofram chambers is removably secured to said common housing, in which the interior of said common housing communicates with said second subchamber through a large-area passage, and in which said means to transmit to said first subchamber the water pressure present in said water main comprises communicating internal passages which extend through said common housing and through said wall means.

23. The invention as claimed in claim 22, in which restrictor means are provided in at least one of said communicating internal passages.

* * * * *